(12) United States Patent
Howard et al.

(10) Patent No.: US 10,760,547 B2
(45) Date of Patent: Sep. 1, 2020

(54) SYSTEM AND METHOD FOR CONTROLLING VOLTAGE OF A DC LINK OF A POWER CONVERTER OF AN ELECTRICAL POWER SYSTEM

(71) Applicant: General Electric Company, Schenectady, NY (US)

(72) Inventors: Dustin Howard, Atlanta, GA (US); Min Naing Lwin, Schenectady, NY (US); Robert Gregory Wagoner, Roanoke, VA (US); Govardhan Ganireddy, Salem, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/223,847

(22) Filed: Dec. 18, 2018

(65) Prior Publication Data

US 2020/0191116 A1 Jun. 18, 2020

(51) Int. Cl.

| F03D 7/00 | (2006.01) |
|---|---|
| F03D 7/02 | (2006.01) |
| F03D 9/25 | (2016.01) |
| H02M 7/48 | (2007.01) |
| H02P 21/22 | (2016.01) |
| H02P 9/00 | (2006.01) |
| H02P 101/15 | (2016.01) |

(52) U.S. Cl.
CPC ............ *F03D 7/0284* (2013.01); *F03D 7/022* (2013.01); *F03D 7/0272* (2013.01); *F03D 9/255* (2017.02); *H02M 7/48* (2013.01); *H02P 9/007* (2013.01); *H02P 21/22* (2016.02); *F05B 2270/337* (2013.01); *H02P 2101/15* (2015.01); *H02P 2207/073* (2013.01)

(58) Field of Classification Search
CPC ........ F03D 7/0284; F03D 9/255; F03D 7/022; F03D 7/0272; H02P 21/22; H02P 9/007; H02P 2101/15; H02P 2207/073; F05B 2270/337; H02M 7/48
See application file for complete search history.

(56) References Cited

U.S. PATENT DOCUMENTS

| 7,425,771 B2 | 9/2008 | Rivas et al. |
|---|---|---|
| 7,638,983 B2 | 12/2009 | Park et al. |
| 7,843,078 B2 | 11/2010 | Santiago et al. |
| 8,018,082 B2 | 9/2011 | Scholte-Wassink et al. |
| 8,050,062 B2 | 11/2011 | Wagoner et al. |

(Continued)

*Primary Examiner* — Julio C. Gonzalez
(74) *Attorney, Agent, or Firm* — Dority & Manning, P.A.

(57) ABSTRACT

A method for controlling voltage of a DC link of a power converter of an electrical power system connected to a power grid includes operating the DC link to an optimum voltage set point that achieves steady state operation of the power converter. The method also includes monitoring the power grid for one or more transient events that may be an indicator of one or more sub-synchronous control interaction (SSCI) conditions occurring in the electrical power system. Upon detection of the transient event(s) occurring in the power grid, the method also includes immediately increasing the optimum voltage set point to a higher voltage set point of the DC link. Moreover, the method includes operating the DC link at the higher voltage set point until the sub-synchronous control interaction(s) is damped, thereby optimizing voltage control of the DC link.

12 Claims, 8 Drawing Sheets

(56) References Cited

U.S. PATENT DOCUMENTS

| | | |
|---|---|---|
| 8,076,920 B1 * | 12/2011 | Melanson .......... H02M 1/4208 |
| | | 315/247 |
| 8,183,704 B2 | 5/2012 | Rivas et al. |
| 8,207,623 B2 | 6/2012 | Rivas et al. |
| 8,264,094 B2 | 9/2012 | Rivas et al. |
| 8,294,288 B2 | 10/2012 | Rivas et al. |
| 8,310,074 B2 | 11/2012 | Larsen et al. |
| 8,436,490 B2 | 5/2013 | Gertmar et al. |
| 9,780,709 B2 | 10/2017 | Hardwicke, Jr. et al. |
| 9,828,971 B2 | 11/2017 | Berroteran Gil et al. |
| 9,941,828 B2 * | 4/2018 | Ren ..................... H02P 9/105 |
| 2009/0278354 A1 * | 11/2009 | Ichinose ................ H02P 9/007 |
| | | 290/44 |
| 2012/0139246 A1 * | 6/2012 | Rafoth ................... H02J 3/386 |
| | | 290/44 |
| 2013/0038061 A1 | 2/2013 | Rivas et al. |
| 2013/0147201 A1 | 6/2013 | Roesner et al. |
| 2013/0176751 A1 * | 7/2013 | Olea .................... H02J 3/1842 |
| | | 363/16 |
| 2017/0257046 A1 | 9/2017 | Schnetzka et al. |
| 2018/0080434 A1 | 3/2018 | Carr et al. |
| 2018/0159453 A1 * | 6/2018 | Andersen ............... H02P 9/007 |
| 2019/0123559 A1 * | 4/2019 | Dong ...................... H02J 3/28 |
| 2019/0305667 A1 * | 10/2019 | Wang .................. H02M 3/1584 |

\* cited by examiner

SYSTEM AND METHOD FOR CONTROLLING VOLTAGE OF A DC LINK OF A POWER CONVERTER OF AN ELECTRICAL POWER SYSTEM

FIELD

The present disclosure relates generally to electrical power systems and, more particularly, to a system and method for controlling voltage of a DC link of a power converter for an electrical power system, such as a wind turbine power system.

BACKGROUND

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy of wind using known airfoil principles. For example, rotor blades typically have the cross-sectional profile of an airfoil such that, during operation, air flows over the blade producing a pressure difference between the sides. Consequently, a lift force, which is directed from a pressure side towards a suction side, acts on the blade. The lift force generates torque on the main rotor shaft, which is geared to the generator for producing electricity.

More specifically, the gearbox steps up the inherently low rotational speed of the rotor for the generator to efficiently convert the rotational mechanical energy to electrical energy, which is fed into a utility grid via at least one electrical connection. Gearless direct drive wind turbines also exist.

Some wind turbine configurations include doubly-fed asynchronous generators (DFAGs). Such configurations may also include power converters that are used to convert a frequency of generated electric power to a frequency substantially similar to a utility grid frequency. Moreover, such converters, in conjunction with the DFAG, also transmit electric power between the utility grid and the generator as well as transmit generator excitation power to a wound generator rotor from one of the connections to the electric utility grid. Alternatively, some wind turbine configurations include, without limitation, alternative types of induction generators, permanent magnet (PM) synchronous generators, electrically-excited synchronous generators, and switched reluctance generators. These alternative configurations may also include power converters that are used to convert the frequencies as described above and transmit electrical power between the utility grid and the generator.

At least some known electric utility grids include one or more series-compensated transmission lines. Sub-synchronous control interactions (SSCI) is a phenomenon that occurs when power-electronic converter controls interact with such series-compensated transmission lines. These interactions can sometimes lead to control instabilities if control systems are not tuned properly or if the control margin of the power converter in properly-tuned control systems is not maintained.

Accordingly, the present disclosure is directed to systems and methods for optimizing the utilization of DC voltage for electrical power systems, such as wind turbine power systems, so as to address the aforementioned issues.

BRIEF DESCRIPTION

Aspects and advantages of the invention will be set forth in part in the following description, or may be obvious from the description, or may be learned through practice of the invention.

In one aspect, the present disclosure is directed to a method for controlling voltage of a DC link of a power converter of an electrical power system connected to a power grid, such as a wind turbine power system. The method includes operating the DC link to an optimum voltage set point that achieves steady state operation of the power converter. Further, the method includes monitoring the power grid for one or more transient events. More specifically, the transient event(s) may be an indicator of one or more sub-synchronous control interaction (SSCI) conditions occurring in the electrical power system. Upon detection of the transient event(s) occurring in the power grid, the method also includes immediately increasing the optimum voltage set point to a higher voltage set point of the DC link. Moreover, the method includes operating the DC link at the higher voltage set point until the sub-synchronous control interaction(s) is damped, thereby optimizing voltage control of the DC link. Accordingly, the method of the present disclosure is also configured to increase an available voltage control margin of the power converter during the SSCI condition(s).

In one embodiment, immediately increasing the optimum voltage set point to the higher voltage set point of the DC link may include determining a voltage command for the optimum voltage set point of the DC link and applying the voltage command to the optimum voltage set point to allow the optimum voltage set point to increase towards the higher voltage set point. In such embodiments, the voltage command may include a voltage rate of change and/or a voltage value.

In another embodiment, determining the voltage command for the optimum voltage set point of the DC link may include receiving one or more rotor DC current regulator outputs and determining if the one or more rotor DC current regulator outputs are above a predetermined threshold. In further embodiments, the method may include immediately increasing the optimum voltage set point to the higher voltage set point of the DC link if the rotor DC current regulator output(s) are above a predetermined threshold.

In additional embodiments, receiving the one or more rotor DC current regulator outputs may include receiving real and imaginary components of the one or more rotor DC current regulator outputs. In another embodiment, determining the voltage command for the optimum voltage set point of the DC link may also include applying a root sum squared method to the real and imaginary components of the rotor DC current regulator output(s) to determine a magnitude of the real and imaginary components of rotor DC current regulator output(s).

In several embodiments, determining the voltage command for the optimum voltage set point of the DC link may include filtering the magnitude of the real and imaginary components of the rotor DC current regulator output(s) using a low-pass filter.

In another embodiment, determining the voltage command for the optimum voltage set point of the DC link may include applying a hysteresis function to the filtered magnitude of the real and imaginary components of the one or more rotor DC current regulator outputs.

In still further embodiments, the method may include, upon detection of the one or more transient events occurring in the power grid, immediately increasing a modulation index limit of the power converter.

In another aspect, the present disclosure is directed to a method for controlling voltage of a DC link of a power converter of an electrical power system connected to a power grid. The method includes operating the DC link to an optimum voltage set point that achieves steady state operation of the power converter. Further, the method includes monitoring the power grid for one or more transient events. More specifically, the transient event(s) may be an indicator of one or more sub-synchronous control interaction (SSCI) conditions occurring in the electrical power system. Upon detection of the one or more transient events occurring in the power grid, the method includes limiting a contribution of non-SSCI-related frequency components to a voltage control margin of the power converter until the sub-synchronous control interaction(s) is damped, thereby optimizing an available control margin during the one or more SSCI conditions.

In yet another aspect, the present disclosure is directed to an electrical power system connected to a power grid. The electrical power system includes a doubly-fed asynchronous generator (DFAG) and a power converter coupled to the DFAG. The power converter is configured to convert a frequency of generated electric power from the DFAG to a frequency substantially similar to a frequency of the power grid. Further, the power converter includes a rotor-side converter, a line-side converter, a DC link, and a control module having a current damping device. The control module is configured to perform one or more operations, including but not limited to operating the DC link to an optimum voltage set point that achieves steady state operation of the power converter, upon detection of one or more transient events occurring in the power grid, immediately increasing a modulation index limit of the power converter, the one or more transient events being an indicator of one or more sub-synchronous control interaction (SSCI) conditions occurring in the electrical power system, and operating the power converter at the increased modulation index limit until the one or more SSCI conditions is damped, thereby optimizing control of sub-synchronous oscillations. It should be understood that the wind turbine power system may further include any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
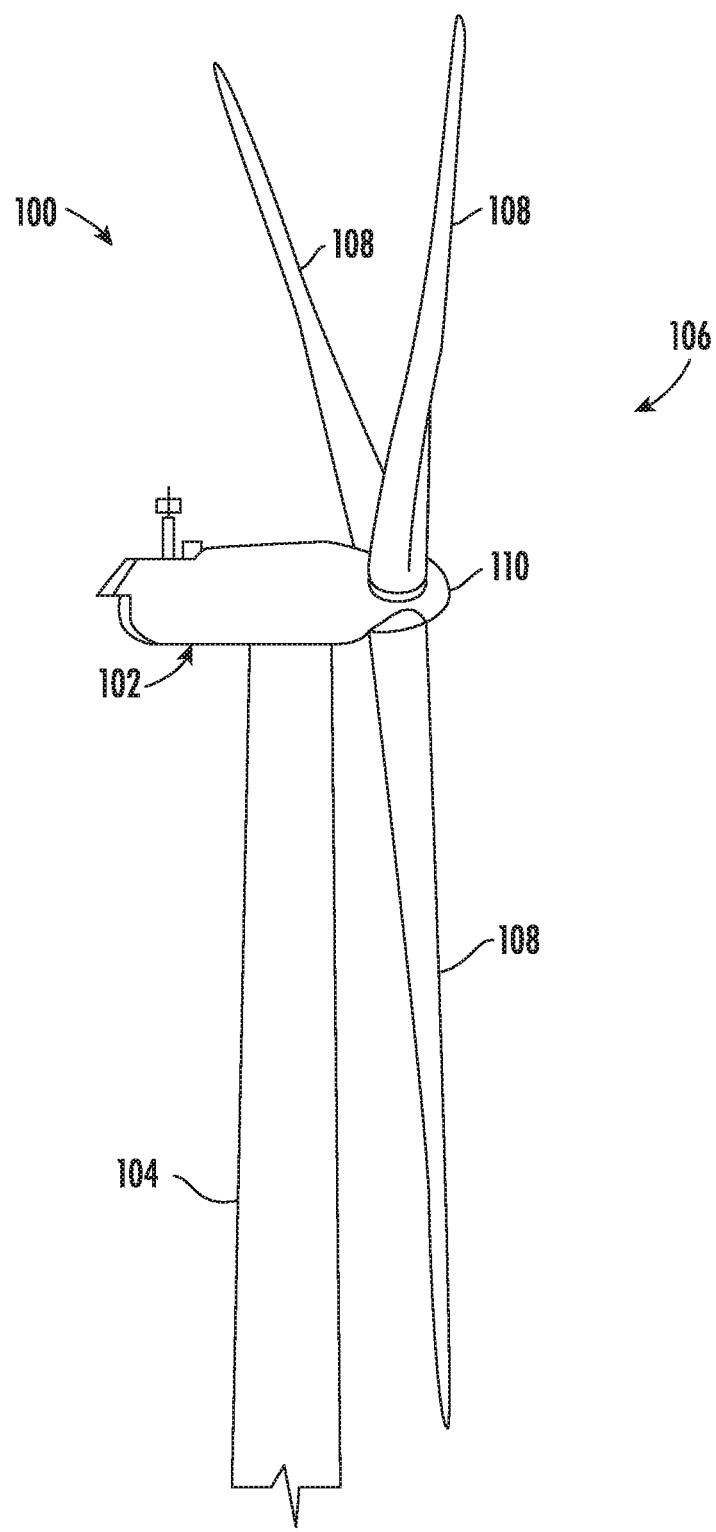
FIG. 1 illustrates a perspective view of one embodiment of a portion of a wind turbine according to the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIG. 1, a perspective view of a portion of an exemplary wind turbine 100 is illustrated. As shown, the wind turbine 100 includes a nacelle 102 housing a generator (not shown in FIG. 1). Further, as shown, the nacelle 102 is mounted on a tower 104 (a portion of the tower 104 being shown in FIG. 1). The tower 104 may have any suitable height that facilitates operation of wind turbine 100 as described herein. The wind turbine 100 also includes a rotor 106 that includes three rotor blades 108 attached to a rotating hub 110. Alternatively, the wind turbine 100 may include any number of rotor blades 108 that facilitate operation of the wind turbine 100 as described herein. In one embodiment, the wind turbine 100 may also include a gearbox (not shown in FIG. 1) operatively coupled to the rotor 106 and a generator (not shown in FIG. 1).

Figure 2:
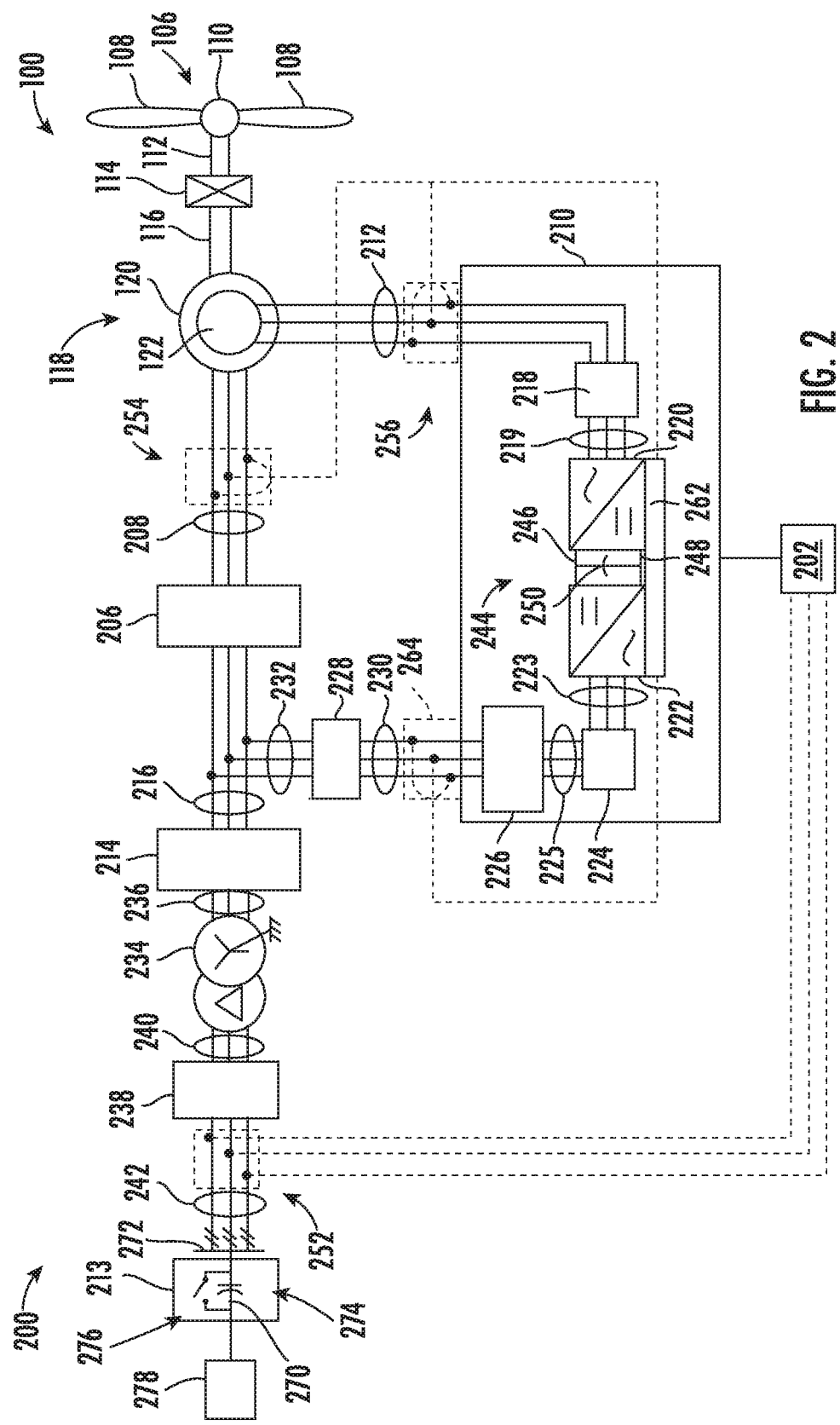
FIG. 2 illustrates a schematic view of one embodiment of an electrical and control system according to the present disclosure that may be used with the wind turbine shown in FIG. 1.

Referring now to FIG. 2, a schematic view of one embodiment of an electrical and control system 200 that may be used with the wind turbine 100 is illustrated. As shown, the rotor 106 includes the rotor blades 108 coupled to the hub 110. The rotor 106 also includes a low-speed shaft 112 rotatably coupled to the hub 110. The low-speed shaft 112 is coupled to a step-up gearbox 114 that is configured to step up the rotational speed of low-speed shaft 112 and transfer that speed to a high-speed shaft 116. In alternative embodiments, the wind turbine 100 may include a direct-drive generator that is rotatably coupled to the rotor 106 without any intervening gearbox. Further, as shown, the high-speed shaft 116 is rotatably coupled to the generator 118. In another embodiment, the generator 118 may be a wound rotor, three-phase, double-fed induction (asynchronous) generator (DFAG) that includes a generator stator 120 magnetically coupled to a generator rotor 122. In an alternative embodiment, the generator rotor 122 may include a plurality of permanent magnets in place of rotor windings.

Still referring to FIG. 2, the electrical and control system 200 may also include a turbine controller 202. The turbine controller 202 may include at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In one embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in one embodiment, additional input channels (not shown in FIG. 2) may be, but are not limited to, computer peripherals associated with an operator interface such as a mouse and a keyboard (neither shown in FIG. 2). Further, in one embodiment, additional output channels may include, but are not limited to, an operator interface monitor (not shown in FIG. 2).

Processors for the turbine controller 202 are configured to process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Referring still to FIG. 2, the generator stator 120 is electrically coupled to a stator synchronizing switch 206 via a stator bus 208. In one embodiment, to facilitate the DFIG configuration, the generator rotor 122 may be electrically coupled to a bi-directional power conversion assembly 210 via a rotor bus 212. Alternatively, the generator rotor 122 may be electrically coupled to the rotor bus 212 via any other device that facilitates operation of the system 200 as described herein. As a further alternative, the system 200 may be configured as a full power conversion system (not shown) known in the art, wherein a full power conversion assembly (not shown in FIG. 2), that is similar in design and operation to power conversion assembly 210, is electrically coupled to the generator stator 120, and such full power conversion assembly facilitates channeling electric power between the generator stator 120 and an electric power transmission and distribution grid 213. In certain embodiments, the stator bus 208 transmits three-phase power from the generator stator 120 to the stator synchronizing switch 206. The rotor bus 212 transmits three-phase power from the generator rotor 122 to the power conversion assembly 210.

In another embodiment, the stator synchronizing switch 206 may be electrically coupled to a main transformer circuit breaker 214 via a system bus 216. In an alternative embodiment, one or more fuses (not shown) are used instead of the main transformer circuit breaker 214. In another embodiment, neither fuses nor the main transformer circuit breaker 214 are used.

In addition, as shown, the power conversion assembly 210 includes a rotor filter 218 that is electrically coupled to the generator rotor 122 via the rotor bus 212. A rotor filter bus 219 electrically couples the rotor filter 218 to a rotor-side power converter 220, and rotor-side power converter 220 is electrically coupled to a line-side power converter 222. The rotor-side power converter 220 and the line-side power converter 222 are power converter bridges including power semiconductors (not shown). In the illustrated embodiment, the rotor-side power converter 220 and the line-side power converter 222 are configured in a three-phase, pulse width modulation (PWM) configuration including insulated gate bipolar transistor (IGBT) switching devices (not shown in FIG. 2) that operate as known in the art. Alternatively, the rotor-side power converter 220 and the line-side power converter 222 may have any configuration using any switching devices that facilitate operation of the system 200 as described herein. Further, the power conversion assembly 210 may be coupled in electronic data communication with the turbine controller 202 to control the operation of the rotor-side power converter 220 and the line-side power converter 222.

In further embodiments, a line-side power converter bus 223 may electrically couple the line-side power converter 222 to a line filter 224. Also, as shown, a line bus 225 may electrically couple the line filter 224 to a line contactor 226. Moreover, as shown, the line contactor 226 may be electrically coupled to a conversion circuit breaker 228 via a conversion circuit breaker bus 230. In addition, the conversion circuit breaker 228 may be electrically coupled to main transformer circuit breaker 214 via system bus 216 and a connection bus 232. Alternatively, the line filter 224 may be electrically coupled to the system bus 216 directly via the connection bus 232 wherein any protection scheme (not shown) is configured to account for removal of the line contactor 226 and the conversion circuit breaker 228 from the system 200. The main transformer circuit breaker 214 may be electrically coupled to an electric power main transformer 234 via a generator-side bus 236. Further, the main transformer 234 may be electrically coupled to a grid circuit breaker 238 via a breaker-side bus 240. The grid circuit breaker 238 may be connected to electric power transmission and distribution grid 213 via a grid bus 242. In an alternative embodiment, the main transformer 234 may be electrically coupled to one or more fuses (not shown), rather than to the grid circuit breaker 238, via the breaker-side bus 240. In another embodiment, neither fuses nor the grid circuit breaker 238 is used, but rather the main transformer 234 may be coupled to the electric power transmission and distribution grid 213 via the breaker-side bus 240 and the grid bus 242.

In another embodiment, the rotor-side power converter 220 may be coupled in electrical communication with the line-side power converter 222 via a single direct current (DC) link 244. Alternatively, the rotor-side power converter 220 and the line-side power converter 222 may be electrically coupled via individual and separate DC links (not shown in FIG. 2). Further, as shown, the DC link 244 may include a positive rail 246, a negative rail 248, and at least one capacitor 250 coupled between the positive rail 246 and the negative rail 248. Alternatively, the capacitor 250 may include one or more capacitors configured in series or in parallel between the positive rail 246 and the negative rail 248.

The turbine controller 202 may also be configured to receive a plurality of voltage and electric current measurement signals from a first set of voltage and electric current sensors 252. Moreover, the turbine controller 202 may be configured to monitor and control at least some of the operational variables associated with the wind turbine 100. In particular embodiments, each of three voltage and electric current sensors 252 may be electrically coupled to each one of the three phases of grid bus 242. Alternatively, the voltage and electric current sensors 252 are electrically coupled to the system bus 216. As a further alternative, the voltage and electric current sensors 252 may be electrically coupled to any portion of the system 200 that facilitates operation of the system 200 as described herein. As a still further alternative, the turbine controller 202 is configured to receive any number of voltage and electric current measurement signals from any number of the voltage and electric current sensors 252, including, but not limited to, one voltage and electric current measurement signal from one transducer.

Referring still to FIG. 2, the system 200 also includes a converter controller 262 that is configured to receive a plurality of voltage and electric current measurement signals from a second set of voltage and electric current sensors 254 coupled in electronic data communication with the stator bus 208, a third set of voltage and electric current measurement signals from a third set of voltage and electric current sensors 256 coupled in electronic data communication with the rotor bus 212, and a fourth set of voltage and electric current measurement signals from a fourth set of voltage and electric current sensors 264 coupled in electronic data communication with the conversion circuit breaker bus 230. The second set of voltage and electric current sensors 254 may be substantially similar to the first set of voltage and electric current sensors 252, and the fourth set of voltage and electric current sensors 264 may be substantially similar to the third set of voltage and electric current sensors 256. Further, the converter controller 262 may be substantially similar to the turbine controller 202 and may be coupled in electric data communication with the turbine controller 202. Moreover, the converter controller 262 may be physically integrated within the power conversion assembly 210. Alternatively, the converter controller 262 may have any configuration that facilitates operation of the system 200 as described herein.

In another embodiment, the electric power transmission and distribution grid 213 may include one or more transmission lines 270 (only one shown for clarity) that are coupled to the grid bus 242 via a grid coupling 272. The transmission lines 270 and/or the electric power transmission and distribution grid 213 may include one or more series compensation elements 274, such as one or more capacitors, to facilitate reducing reactive power losses within the transmission lines 270. As described herein, the series compensation elements 274 may create one or more sub-synchronous resonances within electric power transmission and distribution grid 213. Further, the transmission lines 270 and/or the electric power transmission and distribution grid 213 may also include one or more switches 276 coupled to each series compensation element 274. The switches 276 couple and decouple the series compensation elements 274 to and from the electric power transmission and distribution grid 213, respectively, as desired. More specifically, the switches 276 may be opened to couple the series compensation elements 274 to the electric power transmission and distribution grid 213, and the switches 276 may also be closed to decouple the series compensation elements 274 from the electric power transmission and distribution grid 213. The electric power transmission and distribution grid 213 may also be operatively coupled to one or more loads 278 for providing power to loads 278.

During operation, wind impacts the rotor blades 108 and the blades 108 transform wind energy into a mechanical rotational torque that rotatably drives the low-speed shaft 112 via the hub 110. The low-speed shaft 112 drives the gearbox 114 that subsequently steps up the low rotational speed of the low-speed shaft 112 to drive the high-speed shaft 116 at an increased rotational speed. The high-speed shaft 116 rotatably drives the generator rotor 122. A rotating magnetic field is induced by the generator rotor 122 and a voltage is induced within the generator stator 120 that is magnetically coupled to the generator rotor 122. The generator 118 converts the rotational mechanical energy to a sinusoidal, three-phase alternating current (AC) electrical energy signal in the generator stator 120. The associated electrical power is transmitted to the main transformer 234 via the stator bus 208, the stator synchronizing switch 206, the system bus 216, the main transformer circuit breaker 214 and the generator-side bus 236. The main transformer 234 steps up the voltage amplitude of the electrical power and the transformed electrical power is further transmitted to the electric power transmission and distribution grid 213 via the breaker-side bus 240, the grid circuit breaker 238, and the grid bus 242.

In certain embodiments, a second electrical power transmission path is provided. Electrical, three-phase, sinusoidal, AC power is generated within the generator rotor 122 and is transmitted to the power conversion assembly 210 via the rotor bus 212. Within the power conversion assembly 210, the electrical power is transmitted to the rotor filter 218 wherein the electrical power is modified for the rate of change of the output voltage associated with the rotor-side power converter 220. The rotor-side power converter 220 acts as a rectifier and rectifies the sinusoidal, three-phase AC power to DC power. The DC power is transmitted into the DC link 244. The capacitor 250 facilitates mitigating DC link voltage amplitude variations by facilitating mitigation of a DC ripple associated with AC rectification.

The DC power is subsequently transmitted from the DC link 244 to the line-side power converter 222 wherein the line-side power converter 222 acts as an inverter configured to convert the DC electrical power from the DC link 244 to three-phase, sinusoidal AC electrical power with pre-determined voltages, currents, and frequencies. This conversion is monitored and controlled via the converter controller 262. The converted AC power is transmitted from the line-side power converter 222 to the system bus 216 via the line-side power converter bus 223 and the line bus 225, the line contactor 226, the conversion circuit breaker bus 230, the conversion circuit breaker 228, and the connection bus 232. The line filter 224 compensates or adjusts for harmonic currents in the electric power transmitted from the line-side power converter 222. The stator synchronizing switch 206 is configured to close to facilitate connecting the three-phase power from the generator stator 120 with the three-phase power from the power conversion assembly 210.

The conversion circuit breaker 228, the main transformer circuit breaker 214, and the grid circuit breaker 238 are configured to disconnect corresponding buses, for example, when current flow is excessive and can damage the components of the system 200. Additional protection components may also be provided, including the line contactor 226, which may be controlled to form a disconnect by opening a switch (not shown in FIG. 2) corresponding to each of the lines of the line bus 225.

The power conversion assembly 210 compensates or adjusts the frequency of the three-phase power from the generator rotor 122 for changes, for example, in the wind speed at the hub 110 and the rotor blades 108. Therefore, in this manner, mechanical and electrical rotor frequencies are decoupled from stator frequency.

Under some conditions, the bi-directional characteristics of the power conversion assembly 210, and specifically, the bi-directional characteristics of the rotor-side power converter 220 and the line-side power converter 222, facilitate feeding back at least some of the generated electrical power into the generator rotor 122. More specifically, electrical power is transmitted from the system bus 216 to the connection bus 232 and subsequently through the conversion circuit breaker 228 and the conversion circuit breaker bus 230 into the power conversion assembly 210. Within the power conversion assembly 210, the electrical power is transmitted through the line contactor 226, the line bus 225, and the line-side power converter bus 223 into the line-side power converter 222. The line-side power converter 222 acts as a rectifier and rectifies the sinusoidal, three-phase AC power to DC power. The DC power is transmitted into the DC link 244. The capacitor 250 facilitates mitigating the DC link 244 voltage amplitude variations by facilitating mitigation of a DC ripple sometimes associated with three-phase AC rectification.

The DC power is subsequently transmitted from the DC link 244 to the rotor-side power converter 220 wherein the rotor-side power converter 220 acts as an inverter configured to convert the DC electrical power transmitted from the DC link 244 to a three-phase, sinusoidal AC electrical power with pre-determined voltages, currents, and frequencies. This conversion is monitored and controlled via the converter controller 262. The converted AC power is transmitted from the rotor-side power converter 220 to the rotor filter 218 via the rotor filter bus 219 and is subsequently transmitted to the generator rotor 122 via the rotor bus 212, thereby facilitating sub-synchronous operation.

The power conversion assembly 210 is configured to receive control signals from the turbine controller 202. The control signals are based on sensed conditions or operating characteristics of the wind turbine 100 and the electrical and control system 200, received by the turbine controller 202 and used to control operation of the power conversion assembly 210. Feedback from sensors may be used by the system 200 to control the power conversion assembly 210 via the converter controller 262 including, for example, the conversion circuit breaker bus 230, stator bus and rotor bus voltages or current feedbacks via the second set of voltage and electric current sensors 254, the third set of voltage and electric current sensors 256, and the fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, the converter controller 262 can at least temporarily substantially suspend the IGBTs from conducting within the line-side power converter 222. Such suspension of operation of the line-side power converter 222 can substantially mitigate electric power being channeled through the power conversion assembly 210 to approximately zero.

Figure 3:
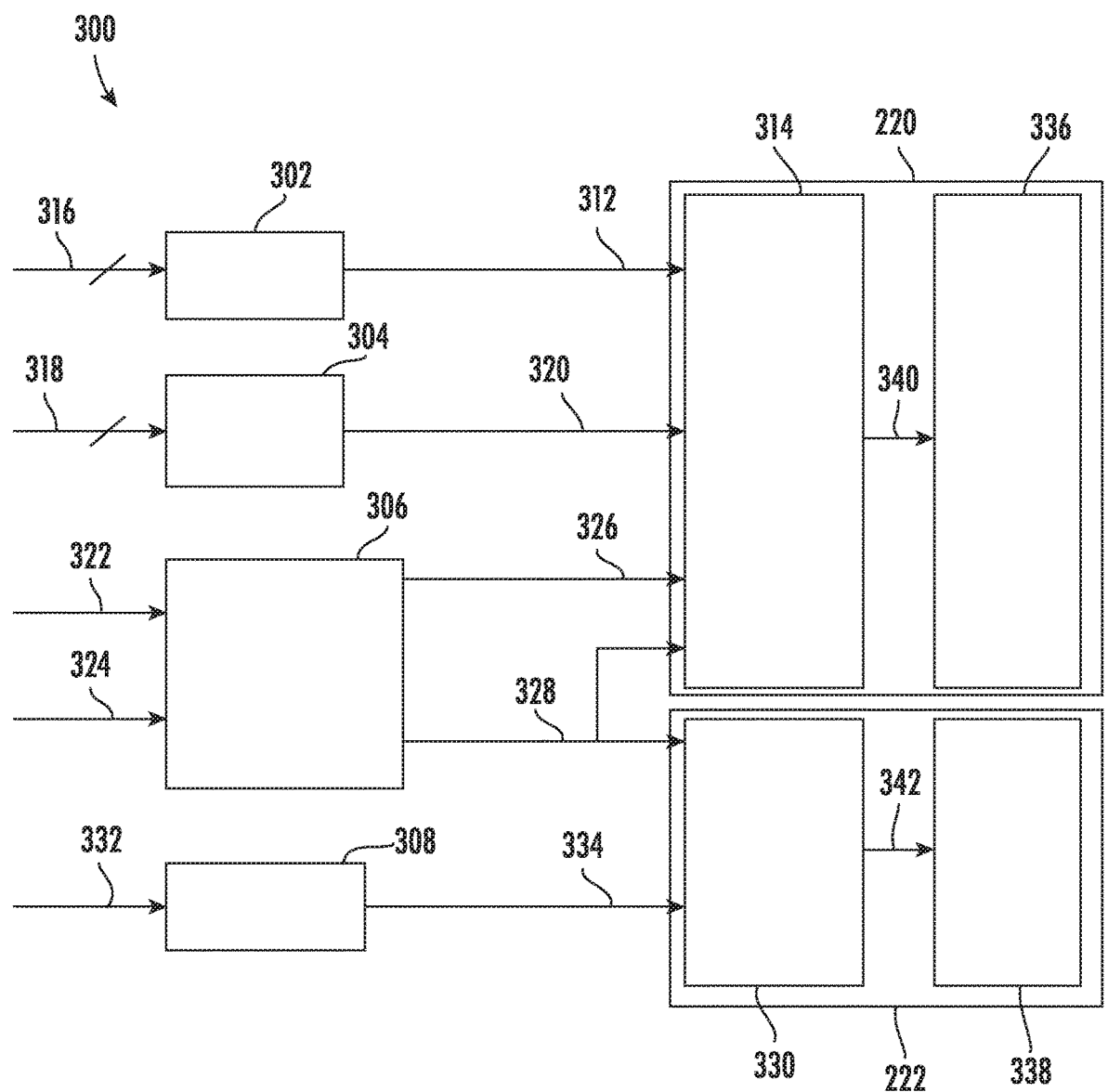
FIG. 3 illustrates a block diagram of one embodiment of a power converter system according to the present disclosure that may be used with the electrical and control system shown in FIG. 2.

Referring now to FIG. 3, a schematic diagram of one embodiment of a power converter system 300 that may be used with the electrical and control system 200 (shown in FIG. 2) is illustrated. As shown, the power converter system 300 includes the rotor-side power converter 220 and the line-side power converter 222. Further, as shown, the power converter system 300 also includes a torque regulator 302, a reactive power regulator 304, a synchronizing phase-locked loop (PLL) 306, and a DC voltage regulator 308.

As such, the torque regulator 302 is configured to transmit a first rotor current command signal 312 to the rotor-side power converter 220, and more specifically, to a rotor converter control module 314 thereof. In such embodiments, the first rotor current command signal 312 can be used to adjust a rotor current based on a desired generator torque command signal 316 received from the turbine controller 202 (shown in FIG. 2). Further, as shown, the reactive power regulator 304 is configured to receive a stator voltage and reactive power command signal 318 from the turbine controller 202 and transmit a second rotor current command signal 320 to the rotor converter control module 314. As such, the second rotor current command signal 320 can be used to control a power factor of the generator 118 by adjusting a ratio of real power to reactive power of the generator 118. In certain embodiments, the torque regulator 302 and the reactive power regulator 304 may be housed within the converter controller 262. In an alternative embodiment, the torque regulator 302 and/or the reactive power regulator 304 may be housed within any other suitable controller, such as the turbine controller 202.

The synchronizing PLL 306 is configured to receive a rotor position feedback signal 322 from a rotor position sensor (not shown) and a stator voltage feedback signal 324 from the second set of voltage and electric current sensors 254 (shown in FIG. 2). As such, the synchronizing PLL 306 is configured to determine a transformation angle signal 326 and a reference angle signal 328 that can be used to transform rotor voltages and rotor currents between two or more signal reference frames, such as a time-based reference frame and a phasor-based reference frame. In one embodiment, the transformation angle signal 326 and the reference angle signal 328 can be used to transform rotor voltages and rotor currents to one or more phasors that include X and Y components of the rotor voltages and/or rotor currents. As used herein, an X component refers to a real component of a phasor, and a Y component refers to an imaginary component of a phasor. The transformation angle signal 326 and the reference angle signal 328 can be transmitted to the rotor converter control module 314 and to a line converter control module 330 that is positioned within line-side power converter 222. The DC voltage regulator 308 receives a DC voltage reference signal 332 that is set, for example, during wind turbine commissioning, and transmits a line current command signal 334 to the line converter control module 330. The line current command signal 334 is used to adjust a DC voltage of the DC link 244 (shown in FIG. 2).

The rotor converter control module 314 is coupled to a rotor converter switching array 336, and the line converter control module 330 is coupled to a line converter switching array 338. In one embodiment, the rotor converter switching array 336 and the line converter switching array 338 each includes a plurality of IGBT switching devices (not shown). Alternatively, the rotor converter switching array 336 and/or the line converter switching array 338 may include any suitable switching devices that enable the rotor-side power converter 220 and the line-side power converter 222 to operate as described herein. In one embodiment, the rotor converter control module 314 and the line converter control module 330 may use pulse-width modulation to control a duty cycle of a rotor converter switch control signal 340 and of a line converter switch control signal 342, respectively. The rotor converter switch control signal 340 controls a switching behavior of the rotor converter switching array 336, and the line converter switch control signal 342 controls a switching behavior of the line converter switching array 338. As such, the rotor converter switching array 336 and the line converter switching array 338 may be controlled to produce one or more desired rotor and/or stator voltage and/or current characteristics.

Although not shown in FIG. 3, one or more control components of the power converter system 300 may receive one or more feedback signals to facilitate maintaining proper operation of the power converter system 300. Such feedback signals include, without limitation, a DC voltage signal, a three-phase rotor current signal (such as from the third set of voltage and electric current sensors 256), a three-phase stator current signal (such as from the second set of voltage and electric current sensors 254), a three-phase line current signal (such as from the fourth set of voltage and electric current sensors 264), a three-phase stator voltage signal (such as from the second set of voltage and electric current sensors 254), and/or a rotor position signal.

Figure 4:
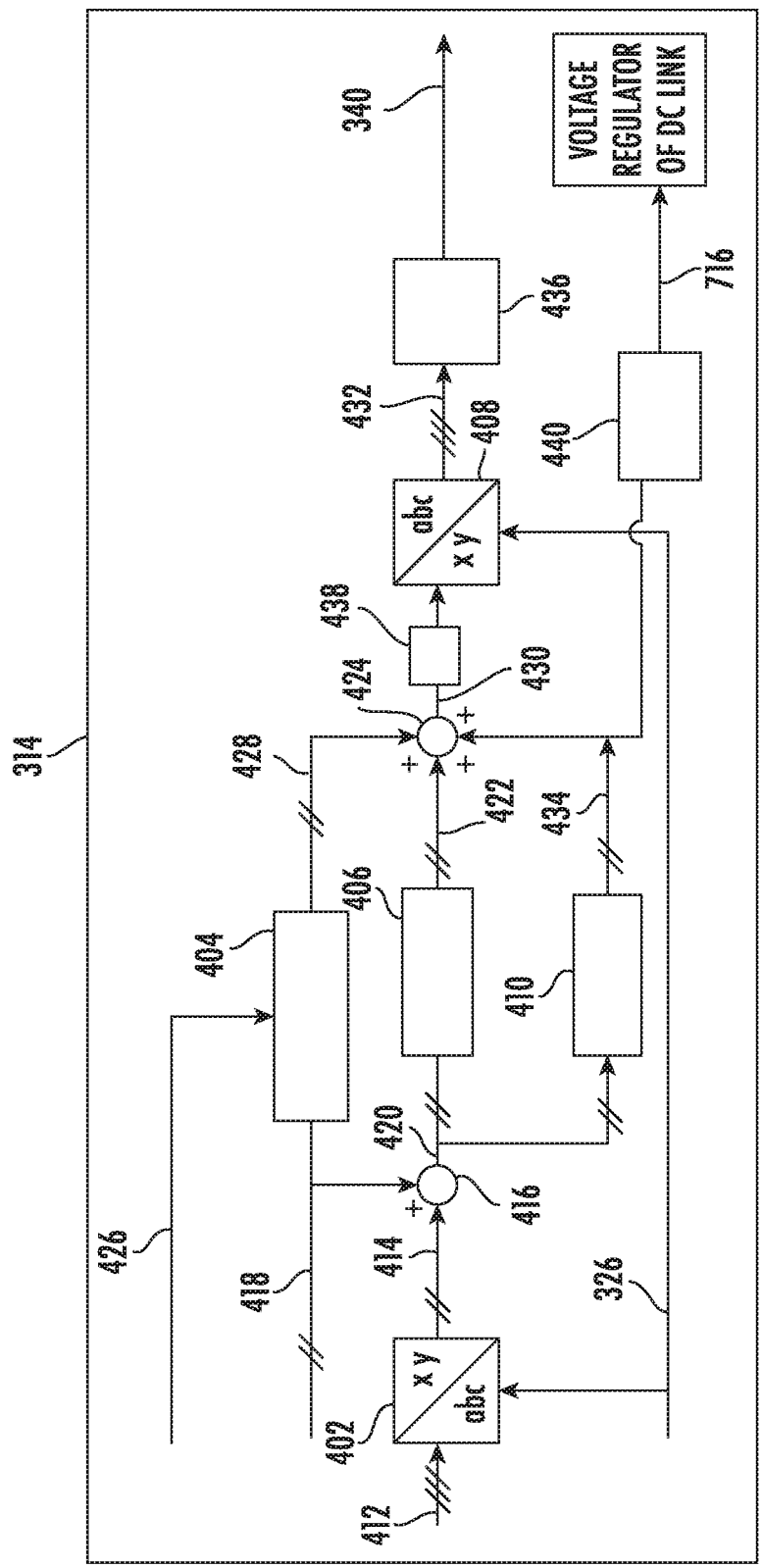
FIG. 4 illustrates a block diagram of one embodiment of a rotor converter control module according to the present disclosure that may be used with the power converter system shown in FIG. 3.

Referring now to FIG. 4, a schematic diagram of one embodiment of a rotor converter control module 314 that may be used with power converter system 300 (shown in FIG. 3) is illustrated. As shown, the rotor converter control module 314 includes a current transform module 402, an impedance feedforward module 404, a regulator module 406, a voltage transform module 408, and a current damping device 410.

More specifically, as shown, the current transform module 402 receives a current feedback signal 412 that includes current measurements from the third set of electric current sensors 256 (shown in FIG. 2) of each phase of the rotor bus 212. In one embodiment, the current feedback signal 412 may include one or more current components from the electric power transmission and distribution grid 213 via the power converter system 300 and/or via the generator 118. In one embodiment, one or more current components may include, for example, one or more sub-synchronous current frequency components and/or one or more grid frequency components that substantially conforms to a frequency of electric power transmission and distribution grid 213. The current transform module 402 receives the transformation angle signal 326 and transforms the three-phase instantaneous currents of the current feedback signal 412 into a phasor-based reference frame. Thus, as shown, the current transform module 402 transmits a current feedback phasor 414 to a current feedback comparator 416. The current feedback comparator 416 receives a current command phasor 418, which includes the first rotor current command signal 312 and the second rotor current command signal 320 (both shown in FIG. 3), and calculates a difference between the current feedback phasor 414 and the current command phasor 418. The current feedback comparator 416 transmits the resulting difference as a current error phasor 420 to the regulator module 406 and to the current damping device 410.

Still referring to FIG. 4, the regulator module 406 receives the current error phasor 420 and performs proportional plus integral feedback regulation to adjust an output of the regulator module 406 to facilitate reducing an error of the current error phasor 420 to substantially 0. The regulator module 406 then transmits a resulting regulator output phasor 422, which is a voltage phasor signal, to a regulator adder 424.

In addition, as shown, the impedance feedforward module 404 receives the current command phasor 418 and a slip frequency signal 426 and computes an amplitude of a feedforward command phasor 428 as a feedforward voltage phasor signal to supplement a closed-loop current regulation of regulator module 406.

Further, in one embodiment, the current damping device 410 receives the current error phasor 420 and facilitates reducing an amplitude of one or more current frequency components represented by current error phasor 420. In certain embodiments, the one or more current frequency components are sub-synchronous to a current frequency of the electric power transmission and distribution grid 213 (shown in FIG. 2). As used herein, the term "sub-synchronous" refers to a frequency that is less than a reference frequency, and in certain embodiments, a frequency that is less than the frequency of the electric power transmission and distribution grid 213. Moreover, as shown, the current damping device 410 transmits a resulting damping control phasor signal 434, which is a voltage phasor signal, to the regulator adder 424 and a sub-synchronous control interactions (SSCI) detection module 440, which is described in more detail with reference to FIG. 7. The output 728 from the SSCI detection module 440 (e.g. a voltage command 716) can then be sent to the DC voltage regulator 308, e.g. in response to detecting an SSCI.

The regulator adder 424 combines the regulator output phasor 422, the feedforward command phasor 428, and the output from the SSCI detection module 440, and transmits a resulting voltage command phasor 430 to a modulation index module 438. In certain instances, the modulation index module 438 is configured to increase a modulation index limit of the power converter 210, e.g. in response to detecting an SSCI. Further, as shown, the resulting voltage command phasor 430 is also transmitted to the voltage transform module 408, which transforms the voltage command phasor 430 to a time-based reference frame using the transformation angle signal 326. In addition, as shown, the voltage transform module 408 outputs a resulting three-phase sinusoidal voltage command signal 432. The voltage command signal 432 is modulated by a pulse-width modulation (PWM) module 436 to generate the rotor converter switch control signal 340. As such, the control module 314 transmits the rotor converter switch control signal 340 to the rotor converter switching array 336 (shown in FIG. 3) to control a switching operation, such as a duty cycle, of the switching devices within the rotor converter switching array 336.

Figure 5:
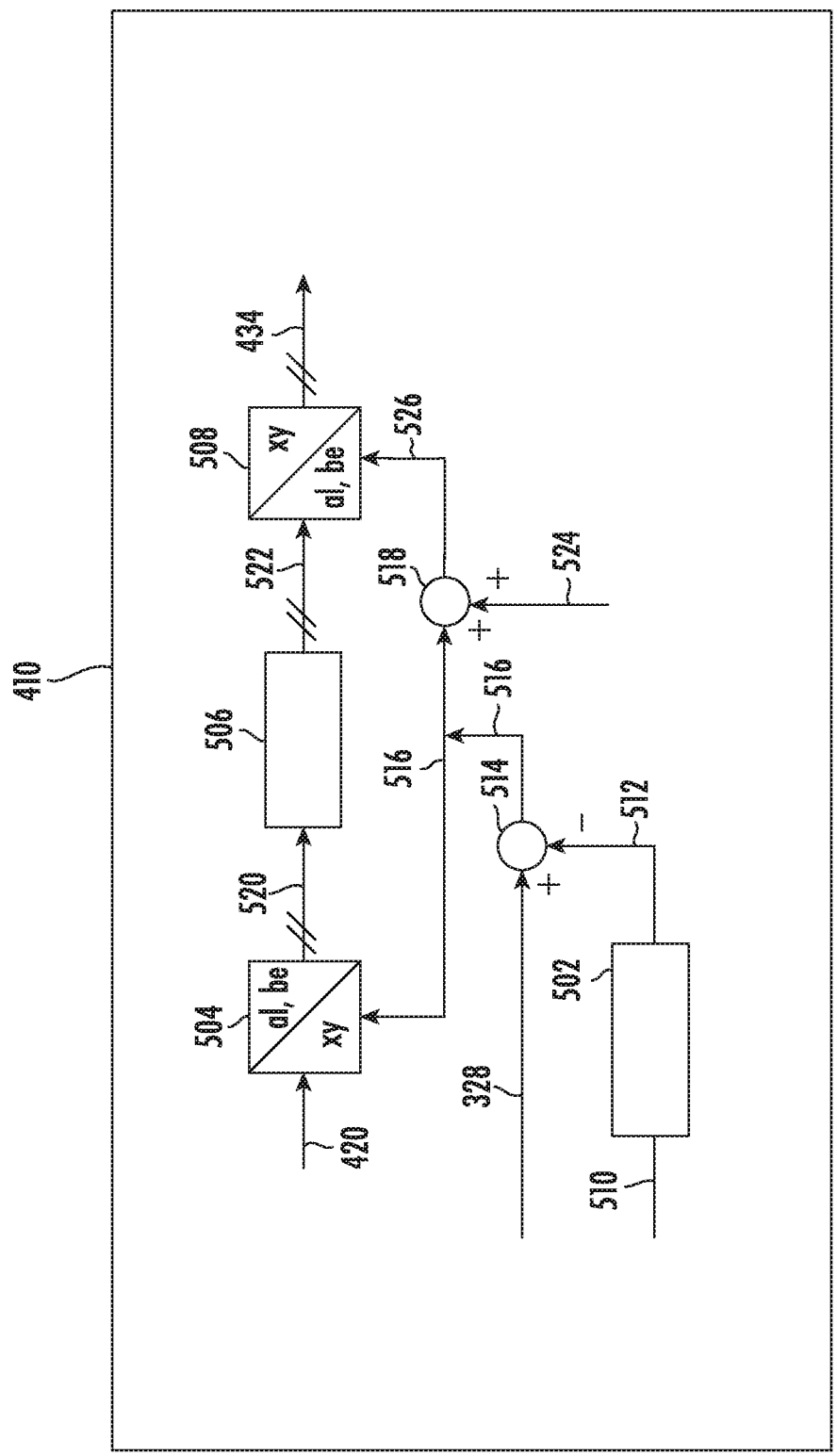
FIG. 5 illustrates a block diagram of one embodiment of a current damping device according to the present disclosure that may be used with the rotor converter control module shown in FIG. 4.

Referring now to FIG. 5, a schematic diagram of a portion of the current damping device 410 that may be used with the rotor converter control module 314 (shown in FIG. 3) is illustrated. As shown, the current damping device 410 may include an integrator module 502, an input transform module 504, one or more sub-synchronous damping control (SSDC) regulator modules 506, and an output transform module 508. The integrator module 502 receives a predetermined sub-synchronous frequency signal 510 that, in one embodiment, represents one or more predetermined sub-synchronous current frequencies to be damped. The sub-synchronous frequency signal 510 is selected as a frequency of a reference frame upon which the sub-synchronous frequency of the grid resonance is acted upon by the SSDC regulator module 506. In one embodiment, the reference frame may have a substantially zero frequency, such that a frequency of one or more signals entering the SSDC regulator module 506 will be equal to a frequency of signals seen from a stationary reference frame. In another embodiment, the reference frame may be selected to rotate near an anticipated frequency of the sub-synchronous grid resonance. Selection of the appropriate sub-synchronous frequency signal 510 is dependent upon the remainder of the system in which the current damping device 410 is embedded, and is done during design studies for tuning the sub-synchronous damping feature of the system.

Thus, as shown, the integrator module 502 integrates the sub-synchronous frequency signal 510 and transmits a resulting sub-synchronous angle signal 512 to a reference angle comparator 514. The reference angle comparator 514 calculates a difference between sub-synchronous angle signal 512 and reference angle signal 328, and outputs a resulting sub-synchronous reference angle signal 516 to input into the transform module 504 and into a sub-synchronous orientation adder 518. The input transform module 504 receives the current error phasor 420, and performs a transformation of the current error phasor 420 using the sub-synchronous reference angle signal 516. More specifically, in certain embodiments, the input transform module 504 transforms the current error phasor 420 into a rotating reference frame that includes two components, a and (3, using the following equations:

$$\alpha = x^* \cos\theta + y^* \sin\theta \qquad \text{(Equation 1)}$$

$$\beta = x^* = \sin\theta + y^* \cos\theta \qquad \text{(Equation 2)}$$

where x is a real component of the current error phasor 420,
y is an imaginary component of the current error phasor 420, and
θ is the sub-synchronous reference angle signal 516.

The rotating reference frame that includes α and β rotates substantially at the frequency of the sub-synchronous current frequency. Thus, as shown, the input transform module 504 transmits a current error transform signal 520 that includes α and β to the SSDC regulator module 506. The current error transform signal 520 includes a frequency component that is substantially equal to the sub-synchronous current frequency. In one embodiment, the SSDC regulator module 506 includes, and/or is configured to perform, a proportional-plus-integral transfer function. Alternatively, the SSDC regulator module 506 includes any suitable transfer function or other algorithm that enables the current damping device 410 to operate as described herein. The SSDC regulator module 506 integrates and adds a gain to current error transform signal 520. The SSDC regulator module 506 then transmits a resulting current sub-synchronous damping transform signal 522 to the output transform module 508. In certain embodiments, the sub-synchronous damping transform signal 522 includes a frequency component that is substantially equal to the sub-synchronous current frequency.

Still referring to FIG. 5, the sub-synchronous orientation adder 518 combines the sub-synchronous reference angle signal 516 with an orientation adjustment reference signal 524, and transmits a resulting output orientation signal 526 to the output transform module 508. Selection of the orientation adjustment reference signal 524 is dependent upon the remainder of the system in which the current damping device 410 is embedded, and is done during design studies for tuning the sub-synchronous damping feature of the system. The output orientation signal 526 is used to adjust an orientation of an output phasor generated by the output transform module 508. The output transform module 508 transforms the current sub-synchronous damping transform signal 522 to a phasor-based reference frame, in a substantially inverse manner as is performed by the input transform module 504. As such, an inverse of Equation 1 may be performed on an a component of the sub-synchronous damping transform signal 522, and an inverse of Equation 2 may be performed on β component of the sub-synchronous damping transform signal 522. The output transform module 508 outputs a resulting damping control phasor 434 as shown in FIG. 4. The damping control phasor 434 includes a frequency component that is substantially equal to a difference between the frequency of the electric power transmission and distribution grid 213 and the sub-synchronous current frequency. The damping control phasor signal 434 may also have real and imaginary components, which are further described herein with reference to FIG. 7.

Figure 6:
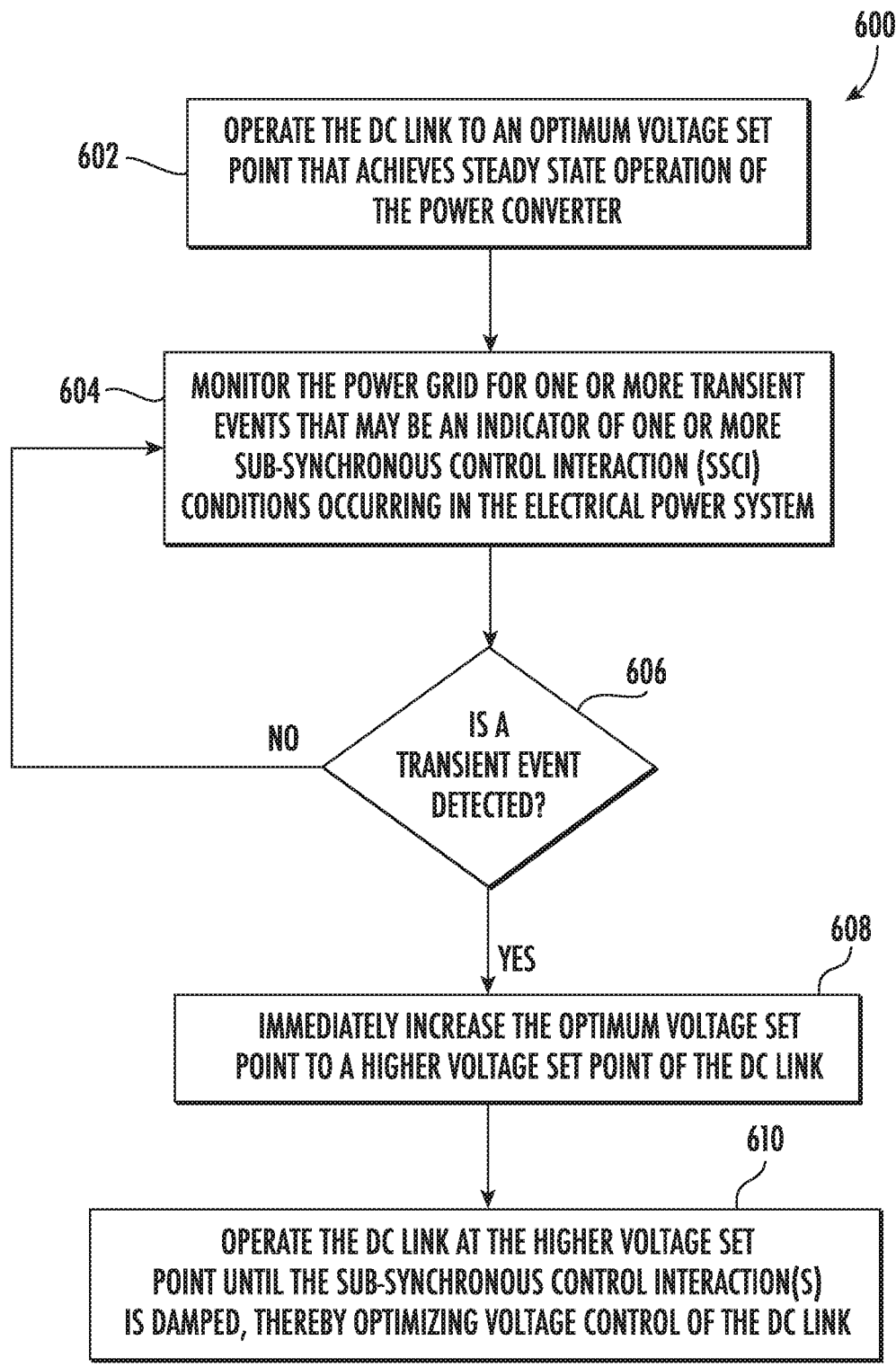
FIG. 6 illustrates a flow chart of one embodiment of a method for controlling voltage of a DC link of a power converter of an electrical power system connected to a power grid according to the present disclosure.

Referring now to FIG. 6, a flow diagram of one embodiment of a method for controlling voltage of a DC link of a power converter of an electrical power system connected to a power grid, such as a wind turbine power system, is illustrated. In general, the method 600 will be described herein with reference to the wind turbine 100 and control system 200 shown in FIGS. 1-5 and 7. However, it should be appreciated that the disclosed method 600 may be implemented with rotor blades having any other suitable configurations. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (602), the method 600 may include operating the DC link 244 to an optimum voltage set point that achieves steady state operation of the power converter 210. As shown at (604), the method 600 may include monitoring the power grid for one or more transient events, e.g. a short-lived burst of energy such as a low-voltage-ride-through event. More specifically, the transient event(s) may be an indicator of one or more sub-synchronous control interaction (SSCI) conditions occurring in the electrical power system. SSCIs are a phenomenon that occurs when power-electronic converter controls interact with series-compensated transmission lines. Thus, as shown at (606), the method 600 may include determining whether one or more transient events are detected. If so, as shown at (608), the method 600 includes immediately increasing the optimum voltage set point to a higher voltage set point of the DC link 244. In one embodiment, the control module 314 may be configured to immediately increasing the optimum voltage set point to the higher voltage set point of the DC link 244 by determining a voltage command 716 for the optimum voltage set point of the DC link 244 and applying the voltage command 716 to the optimum voltage set point to allow the optimum voltage set point to increase towards the higher voltage set point. As shown at (610), the method 600 may include operating the DC link 244 at the higher voltage set point until the sub-synchronous control interaction(s) is damped, thereby optimizing voltage control of the DC link 244.

Figure 7:
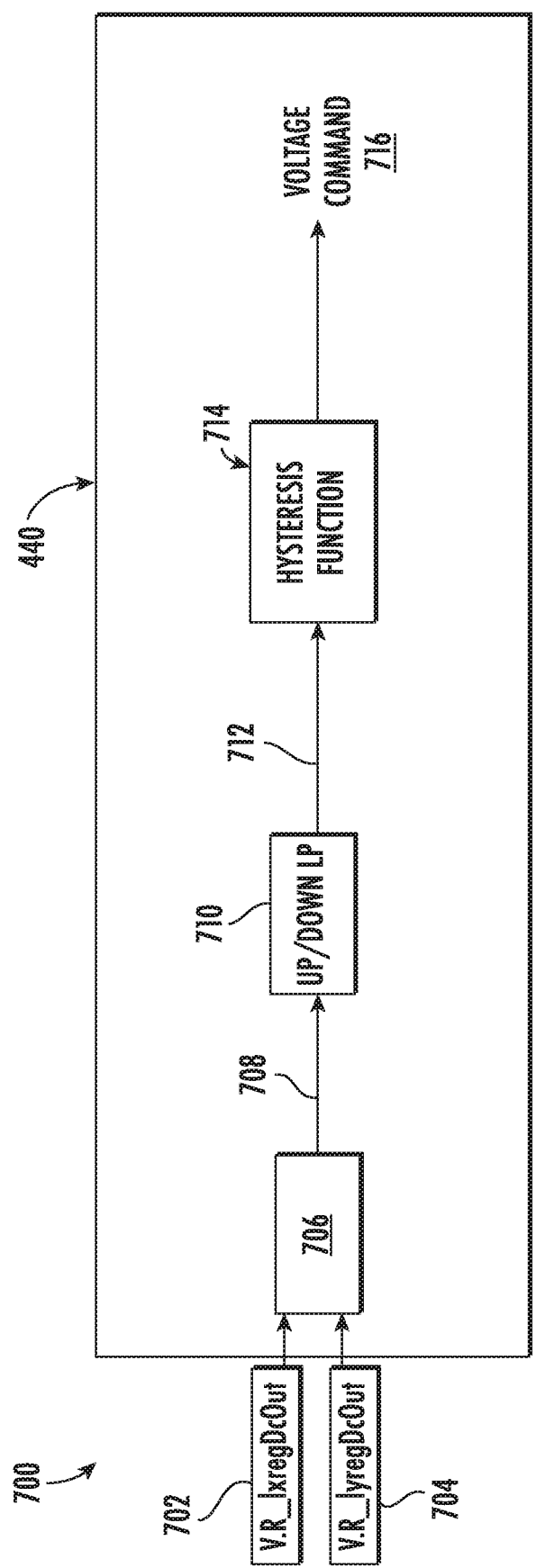
FIG. 7 illustrates a schematic view of one embodiment of an SSCI detection module according to the present disclosure that may be used with the rotor converter control module shown in FIG. 4.

The method 600 of FIG. 6 can be better understood with reference to FIG. 7. As shown, a schematic diagram 700 of one embodiment of the SSCI detection module 440 according to the present disclosure is illustrated. More specifically, as shown, the SSCI detection module 440 may determine the voltage command 716 for the optimum voltage set point of the DC link 244 by receiving one or more rotor DC current regulator outputs 702, 704. For example, as shown, the control module 314 may receive real and imaginary components of the rotor DC current regulator outputs 702, 704 (e.g. real and imaginary components of the damping control phasor signal 434). As such, the control module 314 can then determine if the received rotor DC current regulator outputs 702, 704 are above a predetermined threshold.

More specifically, the rotor DC current regulator outputs 702, 704 are a good indicator of an SSCI condition since the rotor DC current regulator attempts to regular current in the specific frequency range related to sub-synchronous resonant frequencies. Thus, when the outputs of this regulator are oscillating (i.e. non-zero), there is likely some currents in the system oscillating in the sub-synchronous frequency range. In such embodiments, the method 600 may include immediately increasing/boosting the optimum voltage set point to the higher voltage set point of the DC link 244 if the rotor DC current regulator outputs are above the predetermined threshold. Thus, by boosting the DC voltage if a transient event occurs, the control behavior following such an event is improved.

Still referring to FIG. 7, as shown at 706, the control module 314 may determine the voltage command 716 for the optimum voltage set point of the DC link 244 by processing the rotor DC current regulator outputs 702, 704, e.g. using any suitable statistical analysis. For example, in one embodiment, the processor 706 may use the square root of the sum of the squares of the real and imaginary components of the rotor DC current regulator output(s) 702, 704 to determine a magnitude 708 thereof. This magnitude 708 can then be filtered via filter 710. For example, in certain embodiments, the filter 710 may be a low-pass filter. In addition, as shown, a hysteresis function 714 may be applied to the filtered value 712. For example, in certain embodiments, the hysteresis function 714 may include comparing the filtered value 712 to a predetermined threshold. If the value is below the threshold, the control module 314 assumes no SSCI condition is occurring in the power grid. Alternatively, if the value is at or above the threshold, the control module 314 may be configured to toggle between the optimum voltage set point for the DC link 244 and the maximum optimum voltage set point for the DC link 244. Thus, as shown, the output of the hysteresis function 714 may correspond to the voltage command 716. Accordingly, the voltage command 716 may be a desired rate of change, e.g. in volts/second of the DC voltage regulator reference, or a voltage value, e.g. in volts. Thus, as shown in FIG. 4, this signal can be used by the DC voltage regulator.

The above-described embodiments facilitate providing an efficient and cost-effective power converter. The power converter damps, or reduces oscillations of, sub-synchronous currents that may be present within the power converter and/or an electric utility grid. As such, the wind turbine power system described herein may be coupled to the electric utility grid while minimizing damage to the system and/or to one or more electric utility grid components that may result from otherwise undamped sub-synchronous current resonances. More specifically, the embodiments described herein enable a wind turbine power system with a doubly-fed asynchronous generator to be coupled to an electric utility grid that includes one or more series-compensated transmission lines.

Figure 8:
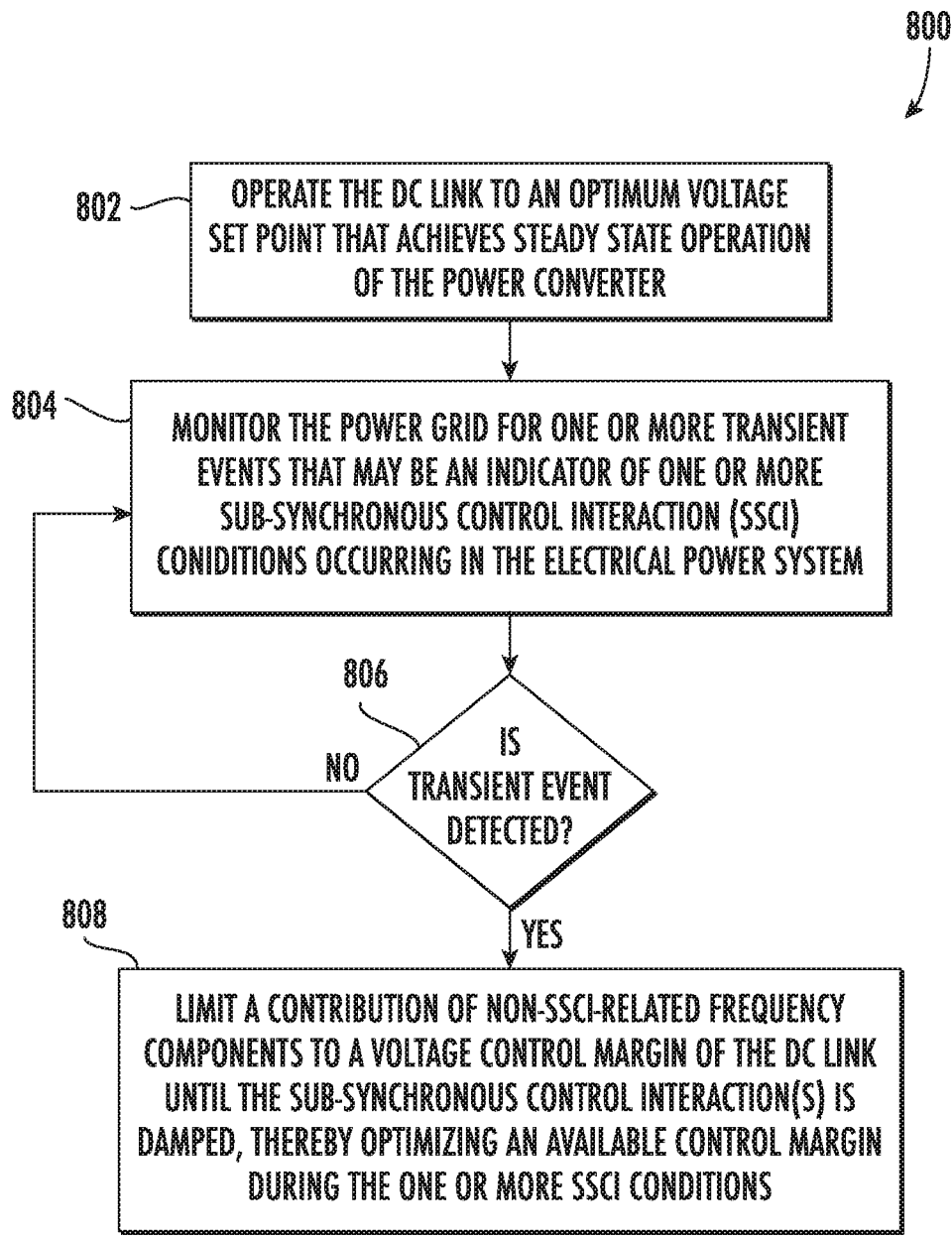
FIG. 8 illustrates a flow chart of another embodiment of a method for controlling voltage of a DC link of a power converter of an electrical power system connected to a power grid according to the present disclosure.

Referring now to FIG. 8, a flow chart of another embodiment of a method for controlling voltage of a DC link of a power converter of an electrical power system connected to a power grid is illustrated. In general, the method 800 will be described herein with reference to the wind turbine 100 and control system 200 shown in FIGS. 1-5 and 7. However, it should be appreciated that the disclosed method 800 may be implemented with rotor blades having any other suitable configurations. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown at (802), the method 800 includes operating the DC link 244 to an optimum voltage set point that achieves steady state operation of the power converter. As shown at (804), the method 800 includes monitoring the power grid for one or more transient events. More specifically, the transient event(s) may be an indicator of one or more sub-synchronous control interaction (SSCI) conditions occurring in the electrical power system. As shown at (806), the method 800 includes determining if a transient event is detected. If so, as shown at (808), the method 800 includes limiting a contribution of non-SSCI-related frequency components to a voltage control margin of the power converter 210 until the sub-synchronous control interaction(s) is damped, thereby optimizing an available control margin during the one or more SSCI conditions.

Exemplary embodiments of a wind turbine, power converter, and methods of converting power are described above in detail. The methods, wind turbine, and power converter are not limited to the specific embodiments described herein, but rather, components of the wind turbine, components of the power converter, and/or steps of the methods may be utilized independently and separately from other components and/or steps described herein. For example, the power converter and methods may also be used in combination with other wind turbine power systems and methods, and are not limited to practice with only the power system as described herein. Rather, one embodiment can be implemented and utilized in connection with many other wind turbine or power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling voltage of a DC link of a power converter of an electrical power system connected to a power grid, the method comprising:
    operating the DC link to an optimum voltage set point that achieves steady state operation of the power converter;
    monitoring the power grid for one or more transient events, the one or more transient events being an indicator of one or more sub-synchronous control interaction (SSCI) conditions occurring in the electrical power system;

upon detection of the one or more transient events occurring in the power grid, immediately increasing the optimum voltage set point to a higher voltage set point of the DC link by determining a voltage command for the optimum voltage set point of the DC link and applying the voltage command to the optimum voltage set point to allow the optimum voltage set point to increase towards the higher voltage set point, wherein determining the voltage command for the optimum voltage set point of the DC link further comprises receiving one or more rotor DC current regulator outputs and determining if the one or more rotor DC current regulator outputs are above a predetermined threshold, wherein the optimum voltage set point is immediately increased to the higher voltage set point of the DC link if the one or more rotor DC current regulator outputs are above the predetermined threshold; and, operating the DC link at the higher voltage set point until the one or more sub-synchronous control interactions is damped, thereby optimizing control of sub-synchronous oscillations.

2. The method of claim 1, wherein the voltage command comprises at least one of a voltage rate of change or a voltage value.

3. The method of claim 1, wherein receiving the one or more rotor DC current regulator outputs further comprises receiving real and imaginary components of the one or more rotor DC current regulator outputs.

4. The method of claim 3, wherein determining the voltage command for the optimum voltage set point of the DC link further comprises applying a root sum squared method to the real and imaginary components of the one or more rotor DC current regulator outputs to determine a magnitude of the real and imaginary components of the one or more rotor DC current regulator outputs.

5. The method of claim 4, wherein determining the voltage command for the optimum voltage set point of the DC link further comprises filtering the magnitude of the real and imaginary components of the one or more rotor DC current regulator outputs using a low-pass filter.

6. The method of claim 5, wherein determining the voltage command for the optimum voltage set point of the DC link further comprises applying a hysteresis function to the filtered magnitude of the real and imaginary components of the one or more rotor DC current regulator outputs.

7. The method of claim 1, further comprising, upon detection of the one or more transient events occurring in the power grid, immediately increasing a modulation index limit of the power converter.

8. An electrical power system connected to a power grid, the electrical power system comprising:

a doubly-fed asynchronous generator (DFAG);

a power converter coupled to the DFAG, the power converter configured to convert a frequency of generated electric power from the DFAG to a frequency substantially similar to a frequency of the power grid, the power converter comprising a rotor-side converter, a line-side converter, a DC link, and a control module comprising a current damping device, the control module configured to perform one or more operations, the one or more operations comprising:

operating the DC link to an optimum voltage set point that achieves steady state operation of the power converter;

upon detection of one or more transient events occurring in the power grid, immediately increasing the optimum voltage set point to a higher voltage set point of the DC link by determining a voltage command for the optimum voltage set point of the DC link and applying the voltage command to the optimum voltage set point to allow the optimum voltage set point to increase towards the higher voltage set point, wherein determining the voltage command for the optimum voltage set point of the DC link further comprises receiving one or more rotor DC current regulator outputs and determining if the one or more rotor DC current regulator outputs are above a predetermined threshold, wherein the optimum voltage set point is immediately increased to the higher voltage set point of the DC link if the one or more rotor DC current regulator outputs are above the predetermined threshold, the one or more transient events being an indicator of one or more sub-synchronous control interaction (SSCI) conditions occurring in the electrical power system; and, operating the power converter at the higher voltage set point until the one or more SSCI conditions is damped, thereby optimizing control of sub-synchronous oscillations.

9. The electrical power system of claim 8, wherein the voltage command comprises at least one of a voltage rate of change or a voltage value.

10. The electrical power system of claim 8, wherein determining the voltage command for the optimum voltage set point of the DC link further comprises applying a root sum squared method to real and imaginary components of the one or more rotor DC current regulator outputs to determine a magnitude of the real and imaginary components of the one or more rotor DC current regulator outputs.

11. The electrical power system of claim 10, wherein determining the voltage command for the optimum voltage set point of the DC link further comprises filtering the magnitude of the real and imaginary components of the one or more rotor DC current regulator outputs using a low-pass filter.

12. The electrical power system of claim 8, wherein the electrical power system comprises a wind turbine power system.

* * * * *